June 4, 1935.  W. D. COCKRELL  2,003,992
TIME DELAY CIRCUIT CONTROLLING APPARATUS
Filed June 8, 1934
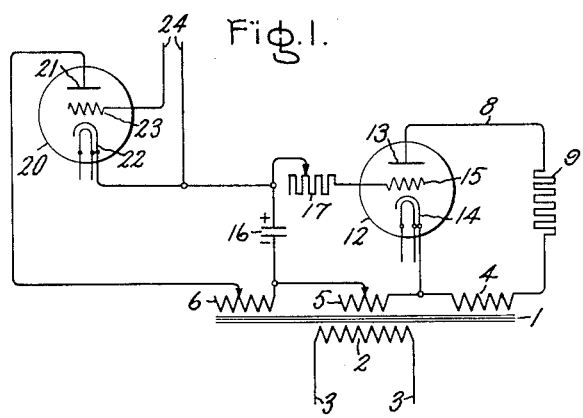
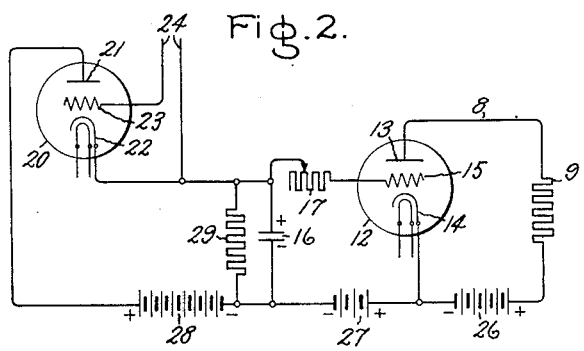
Inventor:
William D. Cockrell,
by Harry E. Dunham
His Attorney.

Patented June 4, 1935

2,003,992

UNITED STATES PATENT OFFICE 2,003,992

TIME DELAY CIRCUIT CONTROLLING APPARATUS

William D. Cockrell, Schenectady, N. Y., assignor to General Electric Company, a corporation of New York Application June 8, 1934, Serial No. 729,634

5 Claims. (Cl. 250—27)

My invention relates to time delay circuit controlling apparatus of the type in which an electric valve controls the circuit and in which the time delay is dependent upon the length of time required for the charge on a capacitor to reduce to a predetermined value. It is the object of my invention to provide improved apparatus of this character which is simple in construction, efficient in operation, and inexpensive to manufacture. A further object of my invention is to provide apparatus of this character wherein the valve holds the circuit controlled thereby substantially closed during the time delay period.

My invention will be better understood from the following description taken in connection with the accompanying drawing, and its scope will be pointed out in the appended claims.

Referring to the drawing, Figs. 1 and 2 are circuit diagrams of apparatus embodying my invention arranged for use respectively on alternating and direct current circuits.

Referring first to Fig. 1, the transformer 1 is shown having its primary 2 connected to a suitable source of supply 3 of alternating current which, for example, may be a 110 volt, 60 cycle source. The transformer is shown having three secondary windings 4, 5 and 6, winding 4 being arranged to supply the load circuit 8 which is to be controlled. This circuit includes the load 9, which may comprise a heating resistor, an electromagnet, or any other load device which is to be energized for a predetermined time. The load circuit is controlled by the electric valve or electron discharge device 12 having the anode 13, the cathode 14, and the control grid 15. Such a valve may be a high vacuum tube, or may be a gas filled or arc discharge tube.

Connected between the cathode and the grid of valve 12 is the secondary 5 by which the grid is given a negative bias during the positive half cycles or those half cycles during which the anode 13 is positive. Included also in the grid-cathode circuit is the capacitor 16 which is of relatively large capacity, for example, 0.5 mfd. and the resistor 17 which preferably is variable and which has a relatively large resistance, for example, 0.5 megohms. By any suitable means the capacitor 16 is given a charge such that that terminal thereof which connects with the grid is positive and by reason of the large resistance of the resistor 17, the capacitor slowly discharges through the valve 12, the discharge forming a grid current. The charge on the capacitor opposes the grid bias of the winding 5 and maintains the grid sufficiently positive to cause the valve substantially to close the load circuit 8 until the capacitor has discharged to a relatively low value. Due to grid rectification action on the negative bias voltage, the capacitor charge is actually reversed at the end of each discharge period and is built up to peak bias voltage. The time required for the discharge of the capacitor through the valve determines the time during which the load circuit 8 is maintained closed and this time may be varied by varying the amount of resistance included in the resistor 17, or by varying the number of turns of winding 5.

Various means may be employed for giving a charge to the capacitor 16. The particular form of such means which I have illustrated comprises the secondary winding 6 controlled by the electric valve or electron discharge device 20 which is shown having the anode 21, the cathode 22, and the control grid 23. To the grid-cathode circuit of valve 20 any suitable control circuit 24 may be connected whereby the valve is caused to become conducting for the purpose of giving capacitor 16 a charge. If valve 20 is a gas or arc discharge tube capacitor 16 may receive its full charge during the first half cycle of operation of the valve. If, however, the valve is a vacuum tube, it may take several half cycles completely to charge the capacitor 16.

In the operation of the apparatus shown by Fig. 1 when the control circuit is energized to cause the valve 20 to pass current the capacitor 16 receives its charge, that side of the capacitor which connects with the grid 15 of valve 12 being made positive. The negative grid bias provided by the winding 5 now is overcome by the charge on the capacitor and the valve 12 begins passing current or substantially closes the load circuit 8. As soon as the control circuit 24 is actuated to interrupt the supply of charging current to capacitor 16 the capacitor by its continued slow discharge through the retarding resistor 17 in the form of a grid current gradually decreases until at the end of the predetermined delay time the capacitor charge no longer is able to oppose the negative grid bias of the winding 5 sufficiently to cause the valve 12 to conduct or to maintain the load circuit 8 substantially closed. Since the length of time during which the load circuit is substantially closed depends upon the amount of charge given to capacitor 16 the time may be readily controlled by the circuit 24 particularly when the valve 20 is a high vacuum tube. The time may be varied as mentioned above by changing the value of the resistor 17 or by changing the number of turns included in the winding 5 to vary the amount of negative bias voltage supplied to grid 15. Moreover, if desired, this time may also be varied by varying the number of turns included in the secondary winding 6.

The modified form of my invention shown by Fig. 2 which is adapted to be operated by direct current is similar to that shown in Fig. 1 with the exception that sources of direct current 26, 27, and 28 are employed in lieu of the secondary windings 4, 5, and 6 respectively. In this form of my invention also I employ the resistor 29 whose value, for example, may be from 1 to 10 megohms arranged to shunt the capacitor 16 whereby the capacitor may eventually become completely discharged after each period of discharge through the valve 12. Since the operation of this form of my invention is similar to that shown in Fig. 1 and described above it is thought to be unnecessary to repeat the description as applied to Fig. 2.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:—

1. Time delay circuit controlling apparatus comprising an electric valve having an anode and cathode connected with said circuit and a control grid, a capacitor connected between the grid and the cathode, means for supplying a negative bias to said grid, means for giving the capacitor a charge opposing said negative bias, and means for retarding the discharge of the capacitor, said capacitor and retarding means being such that the negative grid bias is effectively opposed for the time of said delay.

2. Time delay circuit controlling apparatus comprising an electric valve having an anode and cathode connected with said circuit and a control grid, a capacitor connected between the grid and the cathode, means in series with said capacitor for supplying a negative bias to said grid, means for giving said capacitor a charge opposing said negative bias and a resistor in series with said capacitor for retarding the discharge thereof through said valve, said capacitor having a relatively large capacitance and said resistor having a relatively large resistance whereby said grid is held substantially positive for said delay time.

3. Time delay apparatus for controlling an alternating current circuit comprising an electric valve having an anode and cathode connected in said circuit and a control grid, a capacitor connected between said grid and cathode, means for supplying a negative bias to said grid, means for giving said capacitor a charge to oppose said negative bias and means for retarding the discharge of the capacitor through the valve, the capacitance of said capacitor and the effect of said retarding means being such that the capacitor charge effectively opposes said negative bias for a plurality of successive cycles of said current.

4. Time delay apparatus for controlling an alternating current circuit comprising an electric valve having an anode and cathode connected in said circuit and a control grid, a capacitor connected between said grid and cathode, a source of alternating current connected in series with said capacitor for supplying a negative bias to said grid, means for giving said capacitor a charge having a polarity which opposes said bias and causes the valve effectively to close said circuit, and a resistor in series with the capacitor for retarding the discharge thereof to the grid, the capacitance of said capacitor and the resistance of said resistor being so large that the valve continues effectively to close said circuit for a time equal to a plurality of successive cycles of said current.

5. Time delay apparatus for controlling a direct current circuit comprising an electric valve having an anode and cathode connected in said circuit and a control grid, a capacitor connected between the grid and the cathode, a resistor connected across said capacitor, a source of direct current connected in series with said capacitor for supplying a negative bias to said grid, means for giving said capacitor a charge having a polarity which opposes said bias and causes the valve effectively to close said circuit, and a resistor in series with said capacitor for retarding the discharge thereof to the grid, the capacitance of the capacitor and the resistance of the resistor being so large that the valve continues effectively to close said circuit for a time equal to said time delay.

WILLIAM D. COCKRELL.